(No Model.) 2 Sheets—Sheet 1.
A. BLEICHERT.
COUPLING APPARATUS FOR ELEVATED WIRE ROPE TRAMWAYS.
No. 433,974. Patented Aug. 12, 1890.
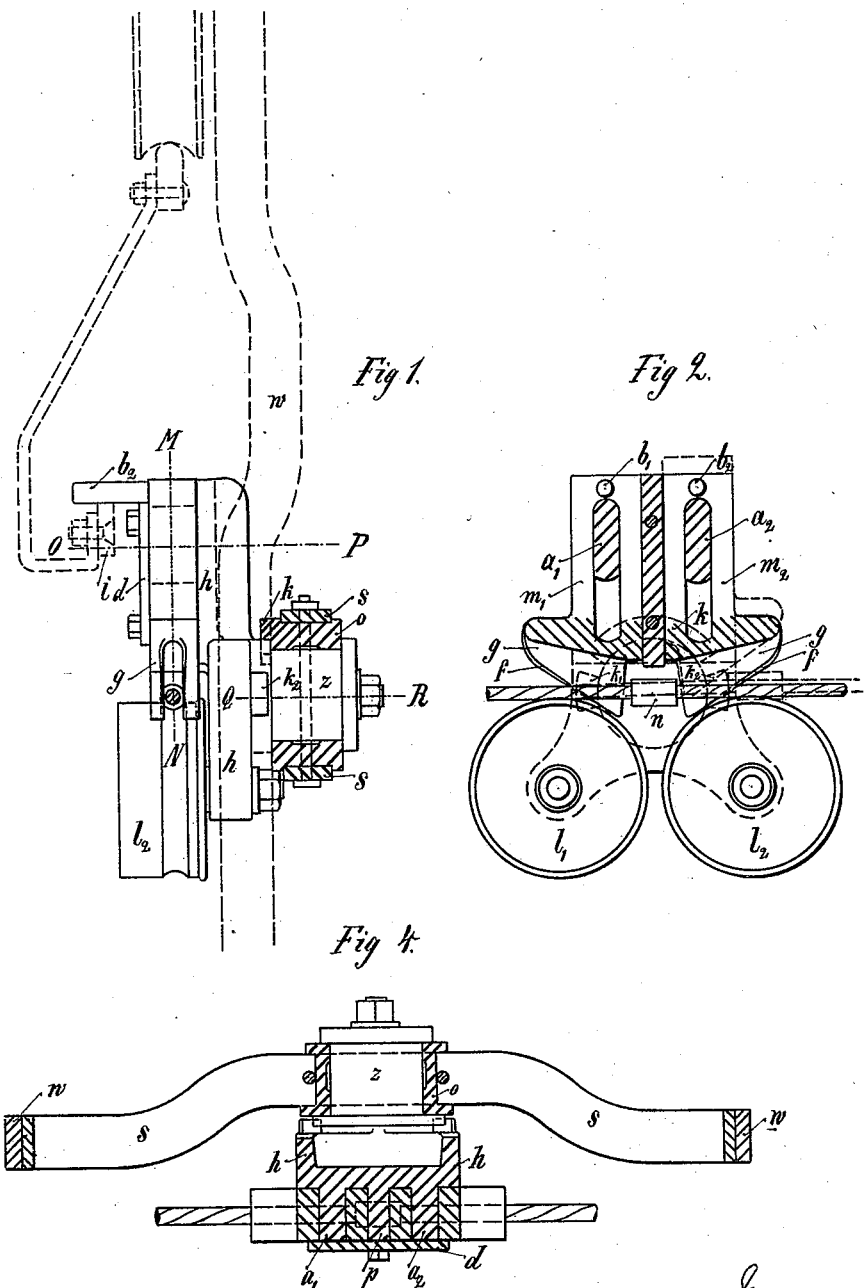

(No Model.) 2 Sheets—Sheet 2.
A. BLEICHERT.
COUPLING APPARATUS FOR ELEVATED WIRE ROPE TRAMWAYS.
No. 433,974. Patented Aug. 12, 1890.
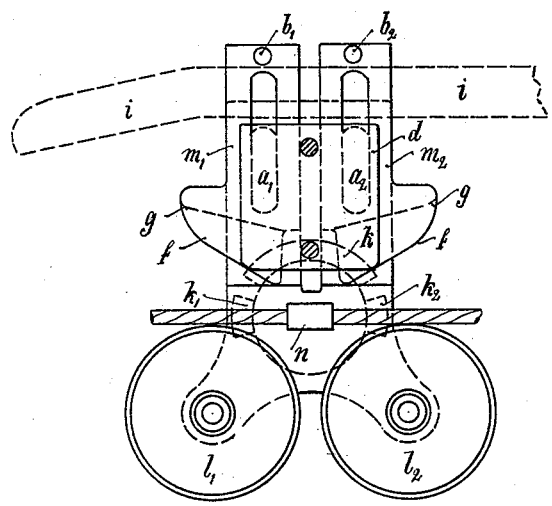
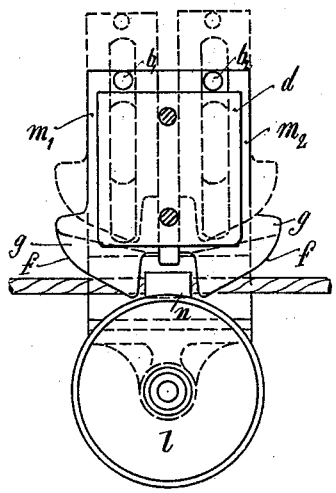
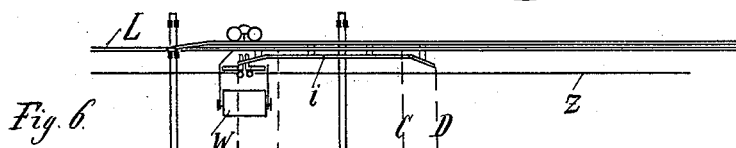
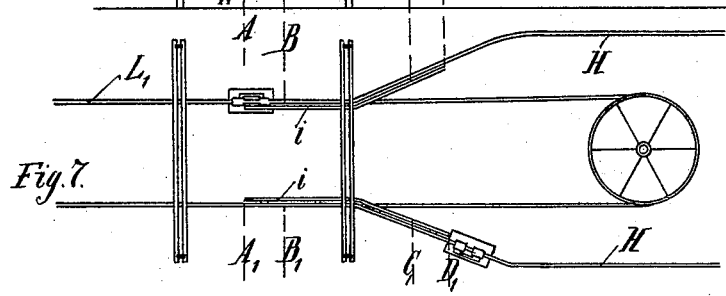
Witnesses:
C. T. Belt.
Geo. L. Wheelock
Inventor.
Adolf Bleichert.
by Herbert W. T. Jenner.
Attorney.
THE NORRIS PETERS CO., PHOTO-LITHO., WASHINGTON, D. C.

UNITED STATES PATENT OFFICE.

ADOLF BLEICHERT, OF LEIPSIC, GERMANY.

COUPLING APPARATUS FOR ELEVATED WIRE-ROPE TRAMWAYS.

SPECIFICATION forming part of Letters Patent No. 433,974, dated August 12, 1890.

Application filed March 13, 1890. Serial No. 343,741. (No model.)

*To all whom it may concern:*

Be it known that I, ADOLF BLEICHERT, engineer, a subject of the King of Saxony, residing at Leipsic, in the Kingdom of Saxony and German Empire, have invented certain new and useful Improvements in Coupling Apparatus for Elevated Wire-Rope Tramways; and I do hereby declare the following to be a full, clear, and exact description of the invention, such as will enable others skilled in the art to which it appertains to make and use the same.

The present invention relates to coupling apparatus for such elevated wire-rope tramways which are worked by a hauling-rope provided with lug-knots.

Figure 1 of the annexed drawings shows in an end elevation the apparatus, together with the adjacent parts of the truck-hanger. Fig. 2 shows a side elevation with partial section on the line M N of Fig. 1; Fig. 3, a side elevation, and Fig. 4 a horizontal section, on the lines O P and Q R of Fig. 1. Fig. 5 represents a modification of the apparatus with only one guide-roller for the traction-rope, while the apparatus above described shows two rollers of this kind. Figs. 6 and 7 show in elevation and plan, in the form of diagrams, the arrangement for the disconnection of the apparatus by a disconnecting-bar forming part of the terminals.

The coupling apparatus consists, as is to be seen from the drawings, essentially of the main piece $h$, upon which the catches $m'$ and $m^2$ slide, and of the guide-rollers $l'$ and $l^2$, supporting the hauling-rope. The main piece $h$ is bolted or secured in any other way to the cross-bar $s$, connecting the two legs of the truck-hanger $w$ with each other. Both catches $m'$ and $m^2$ are movable in a vertical direction and are guided on the main piece by means of their slots, the main piece being provided with shoulders $a'$ and $a^2$ of a suitable size. The latter limits the up-and-down motion of the catches, as well in their lowest as in their highest position. A covering-plate $d$, being bolted to the main piece $h$, serves to keep the catches in their right position. The main piece $h$ is provided with two projecting pins, upon which are journaled the pulleys $l'$ and $l^2$, for supporting the hauling-rope. The catches are provided with reversely-inclined forked ends $g$, having their outer edges $f$ chamfered or beveled. When the lug-knot $n$ strikes one of these inclined forks, it lifts the catch and passes into the space between the catches. The lifted catch descends by its own weight, and the lug-knot, bearing on the inner face of the other catch, causes the connection of the apparatus—i. e., of the truck—with the lug-knot of the hauling-rope, and the truck is carried on by this rope. As soon as the truck arrives at one of the terminals, both catches are lifted by means of the bolts $b'$ and $b^2$ and a disconnecting-bar $i$, being arranged on the terminal. This disconnecting-bar $i$ lifts and supports the catches, thus releasing the bucket from the lug-knots. The bucket is then carried on from the rope-rail upon the joining shunt-rails H and leaves the direction of the main line, forcing the hauling-rope to quit the guide-rollers of the apparatus. At this place the aforementioned disconnecting-bar $i$ ends by an inclined portion, enabling the catches to reassume their lowest positions. This operation is repeated in the same manner when the truck leaves the station. A bar similar to the before-mentioned disconnecting or catch bar $i$ lifts the two catches $m'$ and $m^2$ and drops them again farther on, during which time the traction-rope was guided by the guide-rollers.

The next approaching lug-knot enters into the apparatus in the above-described manner, thus connecting the truck with the rope. Figs. 6 and 7 give a general view of the arrangement at the terminal stations, in plan and elevation, representing the moment when the truck W, having arrived at the terminal and left the rope-rail L, is carried upon the hanging rail H. The catches $m'$ and $m^2$ are caught at point A by the disconnecting-bar $i$. At point B they have been lifted to their highest position, in which they remain till point C of the disconnecting-bar $i$ has been reached, at which place they begin slowly to sink and reach their lowest position at point D. The catches $m'$ and $m^2$ of the starting-truck on the opposite side of the line are lifted at point D' and come into their highest position at point C'. While the truck W is proceeding the hauling-rope Z is led upon the guide-rollers of the apparatus. At point B' the sinking of the catches begins, and at point A' they reach their lowest position.

The vertical middle rib $p$, arranged on the main piece and nearly touching the lug-knot $n$, prevents the hauling-rope from being lifted from the guide-rollers.

Figs. 1 to 4 represent an apparatus forming the subject of the present invention and provided with two guide-rollers for the hauling-rope. The main piece $h$ is in this arrangement provided with a short pivot $z$, free to oscillate in the clasping-box $o$, thus enabling the whole apparatus to swing and conform to the more or less inclined position of the hauling-rope. The shoulders $k'$ and $k^2$, arranged on the body $v$, limit, together with the corresponding shoulder $k$ of the main piece $h$, the oscillation of the apparatus.

Fig. 5 represents an apparatus provided with only one guide-roller for the hauling-rope. In this case the main piece $h$ has been secured to the cross-bar $s$ of the hanger.

What I claim is—

1. In a rope-coupling device, the combination, with the main piece $h$, connected to the truck-hanger, of two catches sliding vertically in the said main piece and provided with reversely-inclined forked ends adapted to engage automatically with the lug-knots on the traction-rope, pins projecting laterally from the said catches and adapted to be lifted to disengage the catches from the lug-knots, and means for supporting the traction-rope under the said catches, substantially as set forth.

2. In a rope-coupling device, the combination, with the main piece $h$, provided with a central rib and connected to the truck-hanger, of the two catches sliding vertically in the said main piece on each side of its central rib and provided with reversely-inclined forked ends adapted to engage automatically with the lug-knots on the traction-rope, the cover-plate secured to the said main piece in front of the catches, and means for supporting the traction-rope under the said catches, substantially as set forth.

3. In a rope-coupling device, the combination, with the main piece $h$, provided with projecting shoulders, of the two catches having vertical slots sliding on the said shoulders and provided with reversely-inclined forked ends adapted to engage automatically with the lug-knots on the traction-rope, and means for supporting the traction-rope under the said catches, substantially as and for the purpose set forth.

In testimony whereof I affix my signature in presence of two witnesses.

ADOLF BLEICHERT.

Witnesses:
CARL BORNGRAEBER,
THEODOR BERGNER.